(No Model.)
H. A. BURT.
WHEELBARROW.
No. 600,476. Patented Mar. 8, 1898.
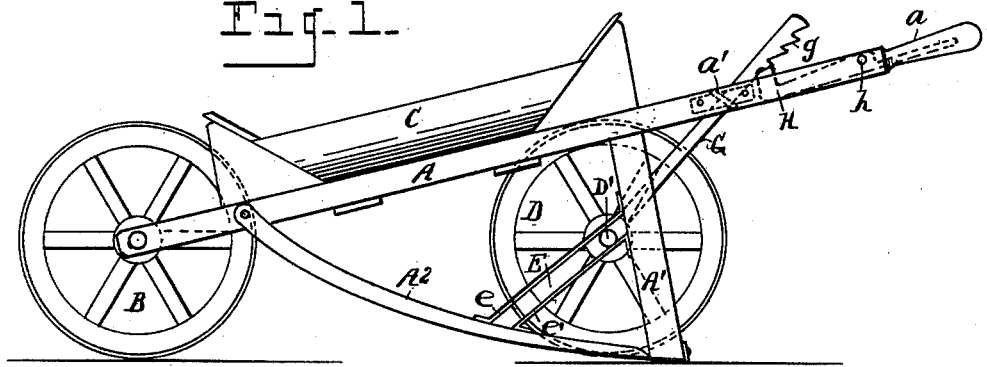
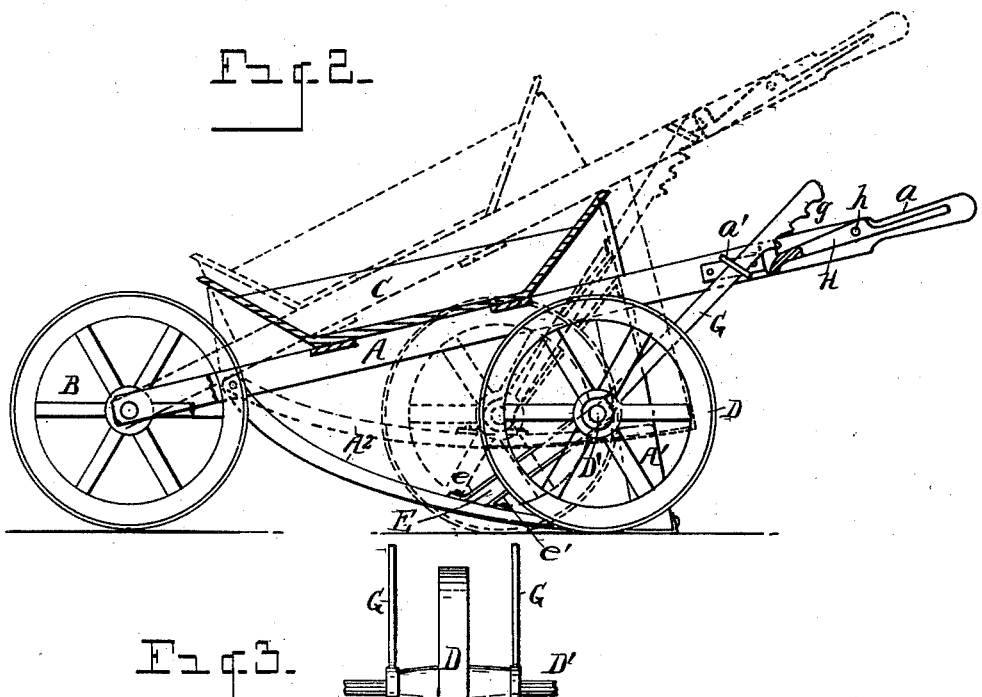
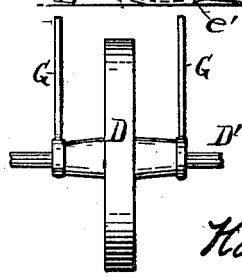
WITNESSES
O. B. Baenziger
Mary Hickey
INVENTOR
Homer A. Burt
By his Attorney
Newell S. Wright

UNITED STATES PATENT OFFICE.

HOMER A. BURT, OF DETROIT, MICHIGAN.

WHEELBARROW.

SPECIFICATION forming part of Letters Patent No. 600,476, dated March 8, 1898.

Application filed May 10, 1897. Serial No. 635,763. (No model.)

*To all whom it may concern:*

Be it known that I, HOMER A. BURT, a citizen of the United States, residing at Detroit, county of Wayne, State of Michigan, have invented a certain new and useful Improvement in Wheelbarrows; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in wheelbarrows; and it consists of the construction, combination, and arrangement of devices hereinafter described and claimed, and illustrated in the accompanying drawings, in which—

Figure 1 is a view in side elevation. Fig. 2 is a view in vertical longitudinal section, and Fig. 3 is a detail view showing certain features of my invention.

The purpose of my invention is to provide a wheelbarrow with an additional supporting-wheel, which may be adjusted into desired position and locked therein, the additional wheel serving to help bear the load, relieving the load largely from the operator or user, enabling larger loads to be carried by the wheelbarrow, while the additional wheel also facilitates the handling of the wheelbarrow.

I carry out my invention as follows:

A represents any suitable frame provided with any suitable legs A' and braces A², connecting the legs with the frame. B represents a customary front wheel heretofore commonly employed, having its axle journaled in the forward ends of the frame A, and C represents the tray. These parts may be made in any suitable manner.

My improvement consists in the provision of a rear wheel D, having its axle D' journaled in such a manner that the wheel may be adjusted upward and downward relative to the frame, preferably at any angle to a vertical plane. As shown in the drawings, this may be accomplished by providing ways E, in which the extremities of the axle D' may have a movable engagement. The way E may be formed in any suitable manner—as, for example, of metallic bars e e', secured at their upper ends to the corresponding legs and at their lower ends to the corresponding braces A², as shown in the drawings. The way E, in which the extremities of the axle D' slide, may extend at any suitable angle to a vertical plane from the brace A² upward and rearward to the corresponding leg. The axle D' is journaled toward its extremities in adjustable bars G G, said bars having a movable engagement with the corresponding sides of the frame A toward the handles a of the frame A. To this end the sides of the frame A may be provided with a loop a', through which the corresponding bar G may slide. The upper ends of said bars G G are toothed, as indicated at g, and the sides of the frame A are provided each with a pawl H, pivoted to the frame, as indicated at h, to engage the toothed portion of the adjacent bar G. The rear end of the pawl H extends rearward adjacent to the corresponding handle a, so that it may be conveniently manipulated by the user. By disengaging the pawls from the toothed portions of the bars G G the weight of the wheel D, together with that of the bars G G, will cause the wheel to slide downward a required distance when the barrow is lifted. When the wheel D slides downward, it will be seen that it approaches nearer to the longitudinal center of the wheelbarrow to more effectually help to support the load. So, also, by disengaging the pawls H from the bars G the axle of the wheel will rise in the ways E, as when it is desired to rest the wheelbarrow upon the ground. The weight of the wheel D, with the bars G G, will thus cause said wheel to drop when the pawls H are disengaged from said bars when the handles a are lifted. Should it become desirable to set down the wheelbarrow, it is only necessary to disengage the pawls from the bars G G, when the weight of the wheelbarrow will move the axle D' upward in the ways E.

The device is evidently simple and not liable to get out of order, while the addition of the wheel D distributes the load better and enables it to be propelled much easier than in the old way, as the wheel D takes the load off from the arms of the user to a very considerable extent.

In Fig. 2 is shown in dotted lines the positions the frame and rear wheel assume relative one to the other when the barrow is lifted into operative position, and whereby the barrow will balance upon both wheels.

What I claim as my invention is—

1. A wheelbarrow having in combination therewith ways, a wheel having a movable engagement in said ways, bars in which the axle of said wheel is journaled, and means to engage said bars to hold said wheel in a given position of adjustment, for the purpose described.

2. The combination with a wheelbarrow provided with legs and braces connecting the legs with the forward part of the frame of the wheelbarrow, of inclined bars e e' engaged with said braces and with said legs, a rear wheel having the extremities of its axle projecting into the ways formed by said bars, bars G in which the axle of said wheel is journaled, and pawls fulcrumed upon the frame of the wheelbarrow to engage the bars G G, said bars being toothed at their upper ends, for the purpose described.

3. The combination with a wheelbarrow, of ways, a wheel having its axis arranged to slide in said ways, adjustable bars carrying said wheel, said bars extending rearward and provided with means to hold them in given position, for the purpose set forth.

4. The combination with a wheelbarrow provided with legs, of braces connecting the legs with the forward part of the frame of the barrow, ways extending from said braces upward and rearward and connected with said legs, a rear wheel adjustable in said ways, and means to hold the wheel in adjusted position, for the purpose set forth.

In testimony whereof I sign this specification in the presence of two witnesses.

HOMER A. BURT.

Witnesses:
N. S. WRIGHT,
MARY HICKEY.